United States Patent
Thirugnanasundaram et al.

(10) Patent No.: US 10,162,884 B2
(45) Date of Patent: Dec. 25, 2018

(54) SYSTEM AND METHOD FOR AUTO-SUGGESTING RESPONSES BASED ON SOCIAL CONVERSATIONAL CONTENTS IN CUSTOMER CARE SERVICES

(71) Applicant: Conduent Business Services, LLC, Dallas, TX (US)

(72) Inventors: Veerasundaravel Thirugnanasundaram, Webster, NY (US); David R. Vandervort, Walworth, NY (US); Tong Sun, Penfield, NY (US); Arun Bakthavachalu, Webster, NY (US)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 467 days.

(21) Appl. No.: 13/948,204

(22) Filed: Jul. 23, 2013

(65) Prior Publication Data

US 2015/0032724 A1   Jan. 29, 2015

(51) Int. Cl.
G06F 17/30 (2006.01)
G06Q 10/10 (2012.01)
G06Q 30/00 (2012.01)
H04L 12/58 (2006.01)

(52) U.S. Cl.
CPC ....... *G06F 17/30654* (2013.01); *G06Q 10/10* (2013.01); *G06Q 30/01* (2013.01); *H04L 51/02* (2013.01); *H04L 51/16* (2013.01); *H04L 51/32* (2013.01)

(58) Field of Classification Search
CPC ................................................. G06F 17/30598
USPC ........................................................ 707/722
See application file for complete search history.

(56) References Cited

U.S. PATENT DOCUMENTS

| | | | |
|---|---|---|---|
| 8,521,818 B2* | 8/2013 | McGann et al. | 709/204 |
| 8,605,885 B1* | 12/2013 | Wooters | H04M 3/51 |
| | | | 379/265.02 |
| 8,767,948 B1* | 7/2014 | Riahi | G06N 99/005 |
| | | | 379/265.02 |
| 9,134,215 B1* | 9/2015 | Vignisson | G06N 5/04 |
| 2002/0107852 A1* | 8/2002 | Oblinger | 707/5 |
| 2004/0162724 A1* | 8/2004 | Hill et al. | 704/231 |
| 2010/0312769 A1* | 12/2010 | Bailey | G06F 17/30705 |
| | | | 707/740 |
| 2011/0238763 A1* | 9/2011 | Shin et al. | 709/206 |
| 2013/0080212 A1 | 3/2013 | Li | |

(Continued)

*Primary Examiner* — Rehana Perveen
(74) *Attorney, Agent, or Firm* — Fay Sharpe LLP

(57) ABSTRACT

A first embodiment of the disclosure relates to a method for responding to a message posted in a social media stream. The method includes monitoring a social media site for at least one message including select subject matter. In response to identifying a message, the method includes collecting a series of exchanges that form a conversational thread including the message. The method includes determining at least one content attribute of the message. The method includes classifying the message using at least one key attribute. The method includes searching a database for a reference message using a combination of the at least one content and key attributes. The method includes determining a previous outcome of a reference thread including the reference message. The method includes using the previous outcome for determining a course of action.

20 Claims, 4 Drawing Sheets

(56) References Cited

U.S. PATENT DOCUMENTS

| | | |
|---|---|---|
| 2013/0086072 A1 | 4/2013 | Peng |
| 2013/0262598 A1* | 10/2013 | Makanawala et al. ....... 709/206 |
| 2014/0214605 A1* | 7/2014 | Argue et al. ................ 705/26.9 |

* cited by examiner

XYZ Mobile – Customer Care Services 🔍 Search

| | Category: | Questions |
| --- | --- | --- |
| | Topic: | Mobile Release |
| | Tags: | plan release 4g mobile nyc |
| | Slugs: | 4g mobile release 4g mobile release plan |
| | | mobile release plan 4g mobile release plan nyc |

☐ When you have planned to release 4G mobiles in NYC?
Customer – Jhon S
☒ 20 Wall st, NYC, USA, 2 mins ago  Reply | Get suggestions | Delete

Suggestions

Positive

We planned to release on coming Sep 21st.
Match accuracy- High   Use this Reply official release date will be announced by end of this week
Match accuracy- High   Use this Reply Release date press meeting is in progress.
Match accuracy- Medium   Use this Reply

Negative

We don't have any release information up to now.
Match accuracy- Medium   Use this Reply We cannot assure the release date right now
Match accuracy- Low   Use this Reply No recent release date available for NYC
Match accuracy- Low   Use this Reply input your tweet content here as a reply to customer question.

( Post Reply )

FIG. 4

SYSTEM AND METHOD FOR AUTO-SUGGESTING RESPONSES BASED ON SOCIAL CONVERSATIONAL CONTENTS IN CUSTOMER CARE SERVICES

BACKGROUND

The present disclosure relates to a method and system for automatically suggesting responses based on social conversational content in customer care services.

Smart phones and social media sites, such as, Twitter, Facebook, LinkedIn and Google Plus, etc., amplify customers' voice in the marketplace. Customers can research companies online, seek recommendations through social media channels, and share opinions about their experiences with certain companies, products and services. Their activity on these sites can affect a company's reputation. Because social media is not as widely moderated as mainstream media, negative postings by individuals can adversely impact others' perceptions of a company. The impact on a brand or company can be far-reaching due to the viral spread of information via social communities connected online. Therefore, companies desire an access to these social conversations and participation in the dialogue as part of their social customer relationship management (CRM) model.

CRM is used to manage a company's interactions with customers, clients, and sales prospects through social media channels. CRM uses technology to organize, automate, and synchronize business processes—principally sales activities—marketing, customer service, and technical support. The overall goals are to find, attract, and earn new clients, nurture and retain existing clients, entice a return of former clients, and reduce the marketing and servicing costs to clients. CRM delivers customer business data to help companies provide customers with desired products and services, provide better customer service, cross-sell and up sell more effectively, and close deals.

A typical CRM model monitors social media posts made about a select product or service, select topics, customer sentiment, user profile, and influence. The posts are collected and forwarded to a customer care query handling expert, which resolves any customer's issue by answering queries based on its knowledge and experience. Because social media is a growing platform, dominated by conversational, transparent and instant interactions among a network of connected customers, companies are challenged to effectively provide customers with instant and accurate solutions.

Therefore, the handling expert must be adept at identifying, analyzing, and solving the customers' problem. The conventional approach is a manual process requiring intensive expert training, so handling experts have different degrees of knowledge. Some experts refer to documentation or senior agents before responding to queries, increasing the response time, which can lead to frustrated and dissatisfied customers.

In a traditional (telephonic) call center environment, service logs automatically generate and/or recommend responses by categorizing verbal-to-textual content in the customer's conversation. However, the service logs do not address social medial contexts presented in an online environment, such as customer locations based on customer profiles, geo-code check-ins, historical conversations with regards to topics, sentiments, and dialog sequence structure, etc. Furthermore, as compared with traditional call-center systems, social contents are more noisy, informal, and conversational in the CRM environment.

A desired CRM approach targets contextual information presented by social conversations to assist an agent's response.

INCORPORATION BY REFERENCE

The disclosure of co-pending and commonly assigned US Patent Application Publication No. 2013/0080212, Published Mar. 28, 2013, entitled, "METHODS AND SYSTEMS FOR MEASURING ENGAGEMENT EFFECTIVENESS IN ELECTRONIC SOCIAL MEDIA", by Li Lei et al., is totally incorporated herein by reference.

The disclosure of co-pending and commonly assigned US Patent Application Publication No. 2013/0086072, published Apr. 4, 2013, entitled, "METHOD AND SYSTEM FOR EXTRACTING AND CLASSIFYING GEOLOCATION INFORMATION UTILIZING ELECTRONIC SOCIAL MEDIA", by Peng Wei et al., the content of which is totally incorporated herein by reference.

BRIEF DESCRIPTION

A first embodiment of the disclosure relates to a method for responding to a message posted in a social media stream. The method includes monitoring a social media site for at least one message including select subject matter. In response to identifying a message, the method includes collecting a series of exchanges that form a conversational thread including the message. The method includes determining at least one content attribute of the message. The method includes classifying the message using at least one key attribute. The method includes searching a database for a reference message using a combination of the at least one content and key attributes. The method includes determining a previous outcome of a reference thread including the reference message. The method includes using the previous outcome for determining a course of action.

Another embodiment of the disclosure relates to a system for responding to a message posted in a social media stream. The system includes an auto-suggesting response device including a processor in communication with the memory for executing modules. The auto-suggesting response device includes a message monitoring module adapted to monitor a social media site for at least one message including select subject matter. In response to identifying a message, the message monitoring module collects a series of exchanges that form a conversational thread including the message. The auto-suggesting response device includes a categorization module adapted to categorize the message into one of a predetermined set of categories. The auto-suggesting response device includes a response search module adapted to search a database for a reference message using a combination of the at least one content and key attributes. The response search module determines an outcome of a reference thread including the reference message. The auto-suggesting response device includes a response generation module adapted to use the outcome to form a response for providing in the thread.

BRIEF DESCRIPTION OF THE DRAWINGS

FIG. 4 shows a sample screenshot generated as output by the method of FIG. 3.

DETAILED DESCRIPTION

The present disclosure relates to a system and method that automatically suggests responses based on social conversational content in customer care services. The system and method responds to issues expressed on social media platforms. The system uses contextual information, extracted from a conversational thread, to customize a query for retrieving application-specific configurations. Results of the query are used to automatically rank suggested responses.

Figure 1:
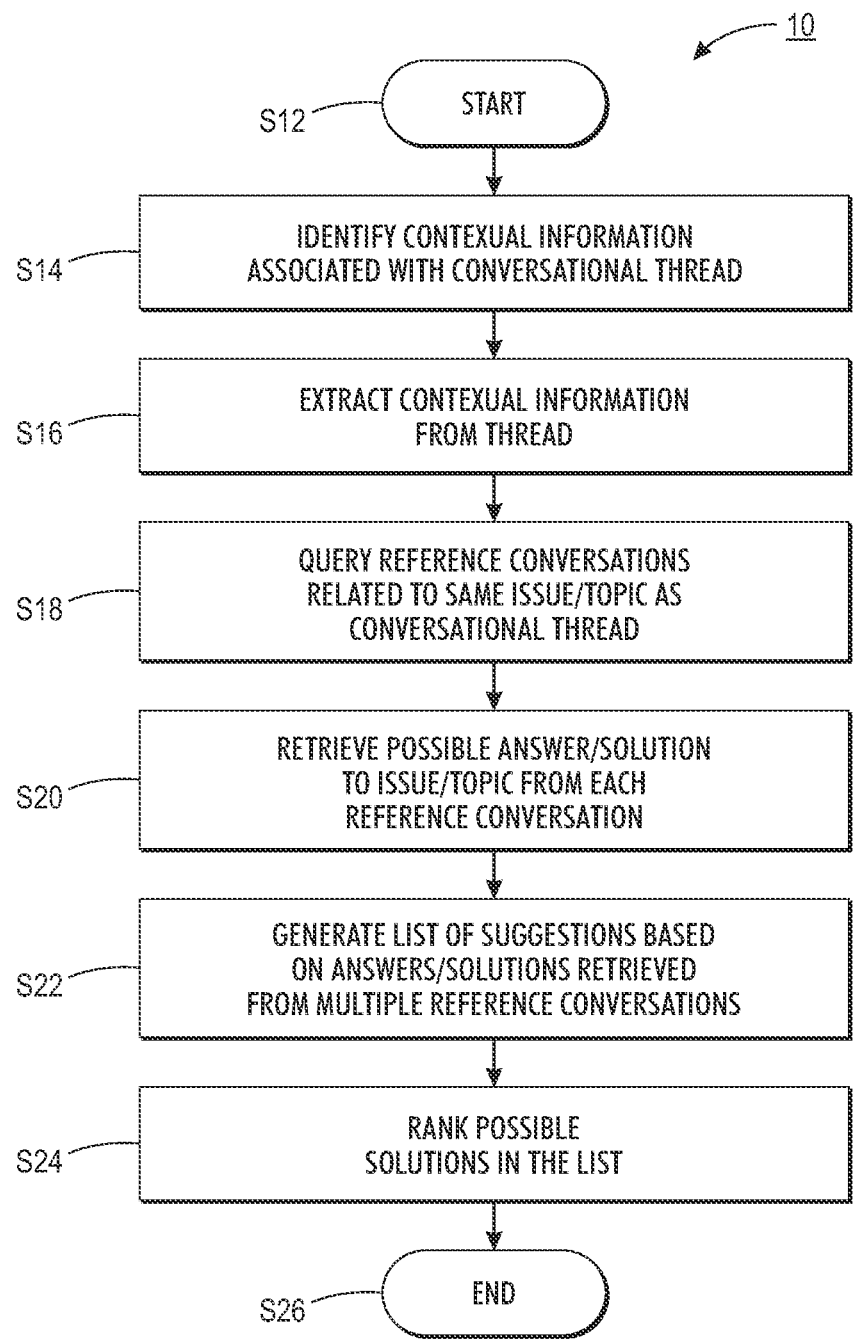
FIG. 1 shows an overview of a method 10 for generating a suggested response.

FIG. 1 shows an overview of a method 10 for generating a suggested response. The method starts at S12. The system identifies and leverages contextual information associated with a particular conversational thread on social media at S14. The contextual information is extracted from the thread at S16. This contextual information includes, for example, slug/tags, topics, category and sequence information, feedback sentiments, and user locations. By extracting relevant contextual information, the system filters out noise in the social conversation. The extracted information is used to query reference conversations discussing a similar topic at S18. By querying 'reference conversations', the system is searching for previously handled customer service matters that resulted in positive customer feedback. The contextual information is used to retrieve possible responses and/or solutions that are relevant to the topic of the thread at S20. The extracted contextual information enables the system to retrieve more relevant responses verses a broader approach that relies on keyword and/or topic matching. The system automatically generates a list of the possible suggestions and/or responses at S22. In one embodiment, the system can rank the suggestions on the list at S24. The method ends at S26.

Figure 2:
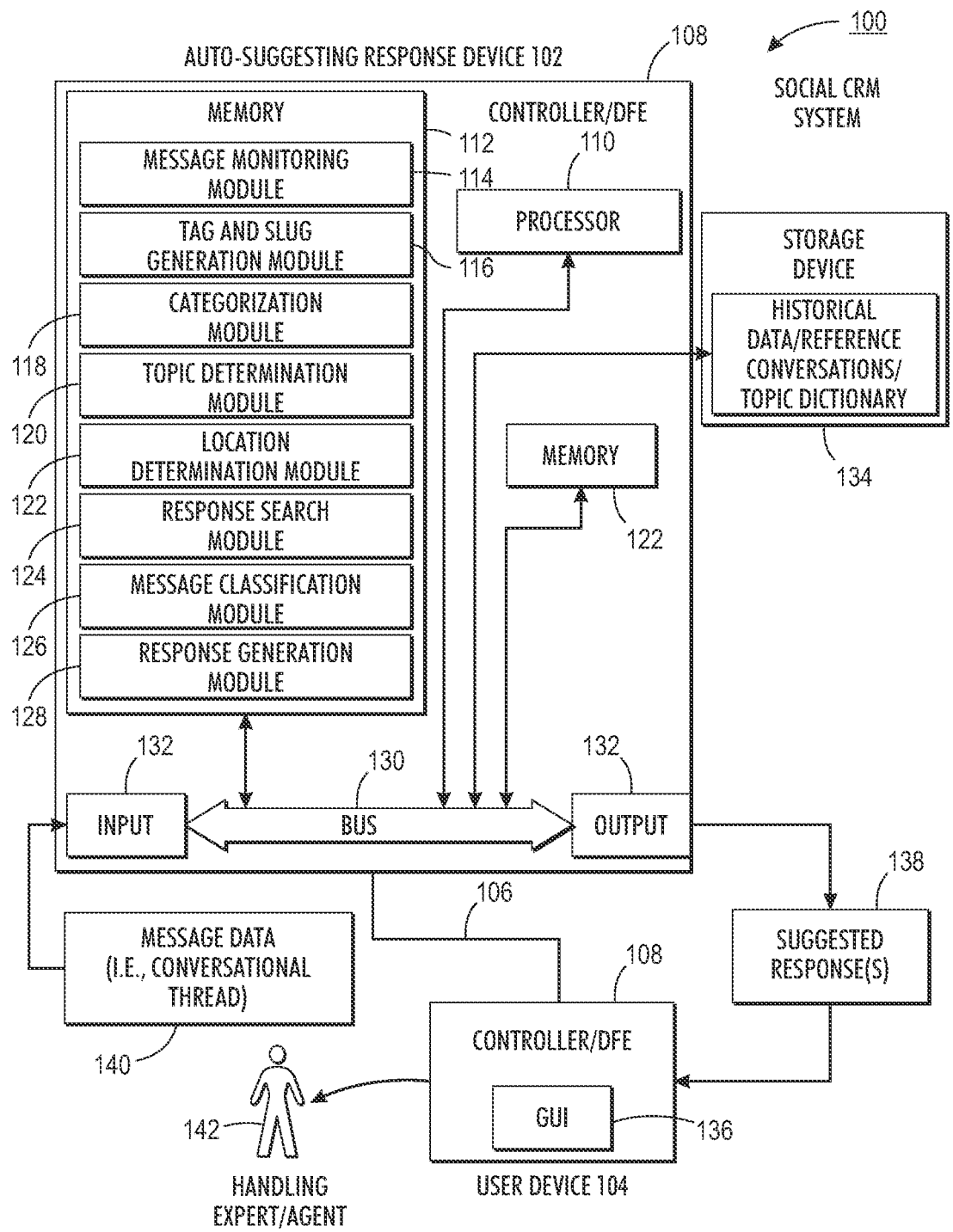
FIG. 2 is a schematic illustration of a social CRM system for monitoring social media sites for issues and generating responses to the issues according to one embodiment.

FIG. 2 is a schematic illustration of a social CRM system 100 in one exemplary embodiment. The system 100 includes an automatic suggested responses device (hereinafter "the auto-suggesting response device") device 102, hosted by a computing device, such as a client computer and/or server device, and a user device 104, similarly hosted by a client computing device, which are linked together by communication links 106, referred to herein as a network. These components are described in greater detail below.

The auto-suggesting response device 102 illustrated in FIG. 2 includes a controller or digital front end ("DFE") 108 that is part of or associated with the device 102. The exemplary controller 108 is adapted for controlling an analysis of message data 140 (i.e., conversational thread) received by the system 100. The controller 108 includes a processor 110, which controls the overall operation of the device 102 by execution of processing instructions that are stored in memory 112 connected to the processor 110.

The memory 112 may represent any type of tangible computer readable medium such as random access memory (RAM), read only memory (ROM), magnetic disk or tape, optical disk, flash memory, or holographic memory. In one embodiment, the memory 112 comprises a combination of random access memory and read only memory. The digital processor 110 can be variously embodied, such as by a single-core processor, a dual-core processor (or more generally by a multiple-core processor), a digital processor and cooperating math coprocessor, a digital controller, or the like. The digital processor, in addition to controlling the operation of the device 102, executes instructions stored in memory 112 for performing the parts of the method outlined in FIGS. 1 and 3. In some embodiments, the processor 110 and memory 114 may be combined in a single chip.

The device 102 may be embodied in a networked device, although it is also contemplated that the device 102 may be located elsewhere on a network to which the system 100 is connected, such as on a central server, a networked computer, or the like, or distributed throughout the network or otherwise accessible thereto. The attribute identification and response search and classification phases disclosed herein are performed by the processor 110 according to the instructions contained in the memory 112.

In particular, the memory 112 stores a message monitoring module 114, which monitors a social media site and collects conversational threads about a select topic; a tag and slug generation module 116, which extracts tags from at least one message within the thread and generates slugs from the tags; a categorization module 118, which categorizes the message into one of a predetermined set of categories classifying a purpose of them message; a topic determination module 120, which compares the message to a stored dictionary to classify the message as belonging to one of a set of predetermined topics; a location determination module 122, which identifies a location of a device posting the message; a response search module 124, which searches a database for reference messages having similar attributes; a message classification module 126, which rates a confidence of each reference message retrieved from the database; and, response generation module 128, which determines an outcome of a previous thread containing the reference message and provides the outcome as a suggested response to the conversational thread. Embodiments are contemplated wherein these instructions can be stored in a single module or as multiple modules embodied in the different devices. For example, the instructions for executing steps in modules 116-120 can be included in one attribute determination module. The modules 114-128 will be later described with reference to the exemplary method.

The software modules 114-128 as used herein, are intended to encompass any collection or set of instructions executable by the device 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the auto-suggesting response device 102 may be all connected by a bus 130.

With continued reference to FIG. 2, the device 102 also includes one or more communication interfaces 132, such as network interfaces, for communicating with external devices. The communication interfaces 132 may include, for example, a modem, a router, a cable, and/or Ethernet port, etc. The communication interfaces 132 are adapted to receive the message data 140 as input.

The device 102 may include one or more special purpose or general purpose computing devices, such as a server computer or digital front end (DFE), or any other computing device capable of executing instructions for performing the exemplary method.

FIG. 2 further illustrates the auto-suggesting response device 102 connected to user device 104, such as an expert handling agent's device, which can transmit an instruction for the auto-suggesting response device to perform the process disclosed here, or for receiving the suggested responses 138 generated by the auto-suggesting response device.

In one embodiment, the user device 104 can be adapted to relay and/or transmit the message data 140 to the auto-suggesting response device 102. In another embodiment, the message data 140 may be input from any suitable source, such as a workstation, a database, a memory storage device, such as a disk, or the like.

With continued reference to FIG. 2, the system 100 includes a storage device 134 that is part of or in communication with the auto-suggesting response device 102. In a contemplated embodiment, the device 102 can be in communication with a server (not shown) that includes a processing device and memory, such as storage device 134, or has access to a storage device 134, for storing the tag dictionary, reference conversations, and/or historical data.

With continued reference to FIG. 2, the message data 140 undergoes processing by the auto-suggesting response device 102 to output the desired information. In one embodiment, this information can include suggested responses 138 for a user 142, such as an expert handling agent, to review. IN another embodiment, this information can include a list of suggested responses, and/or a ranking between a number of suggested responses.

The suggested response information is provided to the user 142 in a suitable form on a graphic user interface (GUI) 136 or to a user device 104, such as a computer belonging to the expert handling and/or customer service agency. The GUI 136 can include a display, for displaying information to users, and a user input device, such as a keyboard or touch or writable screen, for receiving instructions as input, and/or a cursor control device, such as a mouse, trackball, or the like, for communicating user input information and command selections to the processor 110.

Figure 3:
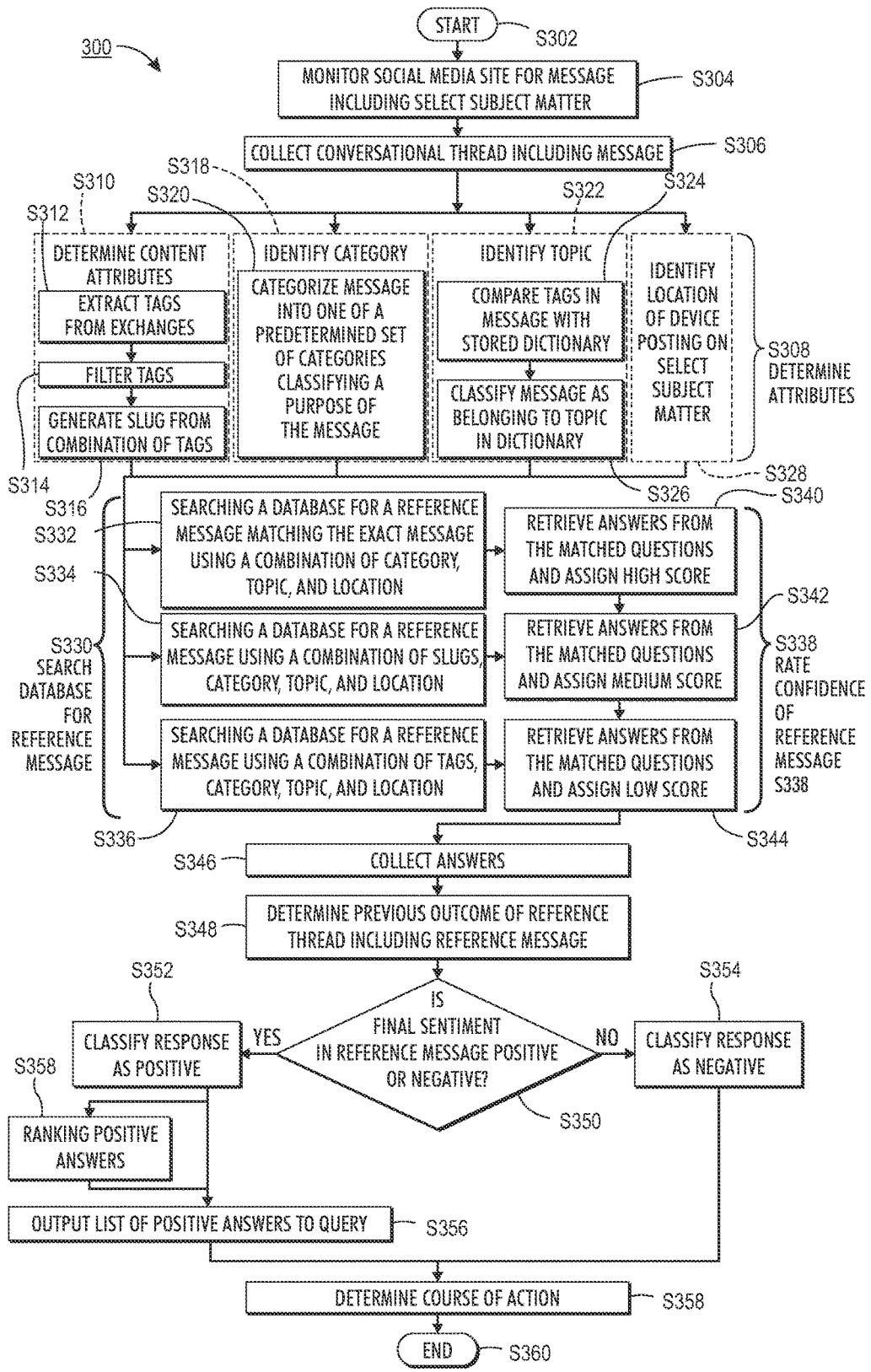
FIG. 3 shows a method 300 for generating suggested responses to a conversational thread posted in a social media site.

FIG. 3 shows a method 300 for generating suggested responses to a conversational thread posted in a social media site. Certain contexts impact the effectiveness of an engagement between expert handling agents and customers, and/or users, of the social media site. These contexts include, for example, topics of conversational threads and messages forming a conversational thread, a sentiment expressed by a user posting a message in the thread, a location where the user is posting the message, and a structure of the dialog. By "structure", the disclosure means a category of the message and a sequence of messages, etc. Therefore, the present disclosure relates to a method that analyzes the foregoing contexts and uses the analysis to suggest responses for assisting the handling agent responding to the message. The method aims to improve the effectiveness of the expert handling agent at resolving the issue and also the overall customer service experience of the user. The method starts at S302.

The system monitors a social media site for a message containing select subject matter at S304. Generally, the system is monitoring the social media site for conversations related to, for example, opinions, grievances, complaints, questions, and/or feedback (hereinafter collectively referred to as "the question" for simplifying a description of one contemplated embodiment) about a product, service, brand, and/or product (hereinafter collectively referred to as "the select subject matter"). Through monitoring the social media site, the message monitoring module 114 identifies the question conveyed in at least one message contained in a conversational thread published on the social media site. In response to identifying a message containing the select subject matter, the module 114 collects the conversational thread including the message at S306.

The disclosure relates to a process for finding responses/answers to the question from similar conversational threads stored in a historical conversation database. As such, the process relies on certain input for outputting the related responses. Accordingly, the system 100 determines attributes at S308 that it associates as the input variables in a later-performed search.

The tag and slug determination module 116 determines a content attribute at S310. More specifically, the module 116 determines a first attribute including at least one of tags and slugs. The module 116 extracts tags from the exchanges and/or messages forming the conversational thread at S312.

To extract tags, the module 116 splits the message (or, in certain embodiments, the entire conversational thread) into separate words. The words are parsed to generate stem-words to be used in a comparison with previous reference messages in the historical database. The stem-words include normalized words, i.e., key terms, from the message. In one embodiment, a text processing parser can parse the split words.

A filter can filter through the split words and remove undesired and irrelevant words form the message at S314. In this manner, the module 116 can associate as tags the key terms extracted from the entire message and/or conversational thread.

The table 1 below illustrates how reference tags and slugs are stored in a database for previous postings on a social media site. For illustrative purposes, the postings in the example include tweets that were posted on the Twitter media site. However, the method disclosed herein is amendable to other social media contents and conversations, such as Facebook wall posts, comments, status updates, and blog entries, etc.

TABLE 1

| | |
|---|---|
| Original Tweet | When you planned to release 4G mobiles in NYC? |
| Split words | When, you, planned, to, release, 4G, mobiles, in, NYC |
| Parsed words | when, you, plan, to, release, 4g, mobile, in, nyc |
| Removing unwanted words | ~~when, you,~~ plan, ~~to,~~ release, 4g, mobile, ~~in,~~ nyc |
| Wanted words or Tags | plan, release, 4g, mobile, nyc |

The table shows that the original message includes a question asking a company when it planned to release an anticipated product. The module 116 split the message into a number of words forming the entire message. The module 116 parsed the words to determine each stem. The module 112 filtered and removed undesired stem-words. In the table, the example stem-words include the product (4g and mobile) and the location (NY) where access to the product is desired. The module 116 associated the remaining stem-words as tags.

The module 116 can combine the tags to form a slug at S316. By "slug", the disclosure refers to a combination of tags forming a generic term which can be used in a comparison with the reference messages and threads previously handled and stored in the database. The tags or slugs are used as a first attribute in the later-discussed comparison.

Another attribute that the system determines is a category of each message. By "category", the disclosure means the purpose that message set forth to convey, such as, inter alia, a question, a complaint, a greeting, an answer, and, a request, etc. A categorization module 118 automatically detects the category of the message in the conversational thread at S318. The module 118 categorizes the message into one of a predetermined set of categories for classifying the purpose of the message at S320. In one embodiment, the module 118 can parse the content in the message, and apply the parsed content as input in a categorization model. In one embodiment, the module 118 can determine the category using the approach described in the disclosure of co-pending and commonly assigned US Patent Application Publication No. 2013/0080212, Published Mar. 28, 2013, entitled, "METHODS AND SYSTEMS FOR MEASURING ENGAGEMENT EFFECTIVENESS IN ELECTRONIC SOCIAL MEDIA", by Li Lei et al., the content of which is totally incorporated herein by reference. In US Patent Publication No. 2013/0080212, an entire conversation history, being a thread of exchanges between a user and a replying agent on a particular topic, is stored in a database, measured, and analyzed.

Table 2 below illustrates example category values output as a result of the sample messages used as input. The model can output a category value. In one embodiment, the module 118 can detect where the message belongs within a sequence of messages forming the thread.

TABLE 2

| Category | Examples |
| --- | --- |
| Question | When balance will be credited to my account? |
| Complaint | My phone won't let me send texts even though my bill isn't due for two days. |
| Request | Is there anything The Social Media Team can assist you with? |
| Answer | Yes please fix the issue ASAP |
| Announcement | That's understandable, but please keep in mind that we will do everything in our power to resolve any issue. |
| Reception | Wow that great and good to hear |
| Thanking | Your feedback is greatly appreciated. |
| Response | You are welcome! |
| Greeting | Hi Hello there |
| Apologies | We are really very sorry to hear that. |
| Solved | Finally I got my message pack last night. |

The words that were parsed from the split message at S312 (or S320) can be used to identify another attribute, being a topic of the message at S322. The words are compared with a stored dictionary at S324. Mainly, the dictionary associates predefined sets of words with particular topics. The dictionary includes a list of words that are previously built and assigned to each topic and associated with a specific area within the topic. For example, the previously built dictionary associates the words "mobile, network, message, down, data" shown in the illustrated example in Table 1 as belonging to the topic "mobile network", and therefore the module 120 can classify the message as belonging to the "mobile network" topic when the split words are compared with the topics. The message is classified as belonging to the identified topic at S326. In the illustrative embodiment, a supervised learning approach can be used to identify the topic.

In a scenario where the combinations of words generate a number of matches for different topics, the module 120 identifies the topic attribute as being the topic resulting from the most words in the combination. In other words, if five split words are used in the comparison, and a combination of three words produces a few matches for topics, and a combination of four words produces a few more matches for topics, but all five words result in a single match for a topic, the system associates the latter topic (corresponding to the five word result) as the topic attribute.

In a similar manner, a sentiment of the message can be identified. A dictionary or database can associate a number of words with one of a number of predetermined sentiments. In one embodiment, the identified sentiment can be one of three predetermined (positive/neutral/negative) sentiments. In another embodiment, the module 120 can assign the words to a sentiment attribute belonging to one of five (positive/somewhat-positive/neutral/somewhat-negative/negative) categories.

In an alternate embodiment, crowd sourcing options, understood in the art, can be used to identify the topic and sentiment of the message.

Continuing with FIG. 3, another attribute that the system can determine at S308 is a location. A location determination module 122 determines a location of the device posting the message about the select subject matter at S328. The module 122 can identify multiple locations information associated with a single message. For social networking sites that allow users to add location information in a user-profile or inside a message, the module 122 can identify the location using the check-in location information within the message and/or user-profile. In another embodiment, the location information may be specified within the message itself, such as in the illustrated example set forth in the original message of Table 1 asking a company about the release of a certain product. The module 122 can identify the location based on the words extracted from the message.

The location information can be extracted and predicted based on a geo location extraction technique, such as by using the approach described in the disclosure of co-pending and commonly assigned US Patent Application No. US Patent Application Publication No. 2013/0086072, published Apr. 4, 2013, entitled, "METHOD AND SYSTEM FOR EXTRACTING AND CLASSIFYING GEOLOCATION INFORMATION UTILIZING ELECTRONIC SOCIAL MEDIA", by Peng Wei et al., the content of which is totally incorporated herein by reference. In US Patent Application Publication No. 2013/0086072, the location is identified based on a learned content-based location-prediction model, which detects a user's geographic location from the message content as being one of a number of predetermined categories, such as a previous, current, or and future location.

The location information is an important attribute drilling down the search results and for determining suggested responses that are relevant for a particular geographical area. This is because the location, and all the attributes determined at S308 for a select, incoming message, are used in a comparison with attributes from reference messages.

Continuing with FIG. 3, the attributes are used to search the reference database at S330. More specifically, a combination of the attributes associated with the current message and thread are used as input in a query for searching a database of reference messages and threads that handled, to completion, the same or similar issues that form the basis of the select message. Using the determined attributes, the response search module 122 uses different combinations of the contextual attributes (such as, tags, slug, sliced words, category, and sequence within the thread, topic, sentiment, and relevant user location information) to search for matching messages in reference conversational threads. Various combinations of the attributes are matched against reference threads stored in the historical database to determine whether any previous messages are available with similar content.

Table 3 shows attribute values that were identified from the sample message illustrated in Table 1. For illustrative purposes, these values are matched against reference messages, i.e., previous messages having related content, based on pre-configured criteria.

TABLE 3

| Attributes | Values |
| --- | --- |
| Original Tweet | When you planned to release 4G mobiles in NYC? |
| Tags | plan, release, 4g, mobile, nyc |
| Slugs | 4g_mobile_release, 4g_mobile_release_plan, mobile_release_plan, 4g_mobile_release_plan_nyc |
| Category | Question |
| Topic | Mobile release |
| Location | NYC |

In one embodiment, a number of searches of the database are performed with various combinations of attributes. However, the priority and sequence of these searches is based on the particular attributes selected for the combination. In a first search of the database, a reference message matching the exact message using a combination of the category, topic, and location attributes at S332. The results of that search are filtered for determining whether a reference message exactly matches the content of the original message. Table 4 shows the attribute values for the category, topic, and location attributes, as well as the matching content results for the illustrative example.

TABLE 4

| Category | Topic | Location | Match query - Exact tweet content |
| --- | --- | --- | --- |
| Question | Mobile Release | NYC | When you planned to release 4G mobiles in NYC? |

A second search of the database is performed for matching the slugs, determined for the original message (at S316), to a reference message using a combination of the category, topic, and location attributes at S334. The results of that search are filtered for determining whether a reference message exactly matches the slugs of the original message. Table 5 shows the attribute values for the category, topic, and location attributes, as well as the matching slug results for the illustrative example.

TABLE 5

| Category | Topic | Location | Match query - Slugs |
| --- | --- | --- | --- |
| Question | Mobile Release | NYC | mobile_release_plan, 4g_mobile_release, 4g_mobile_release_plan, 4g_mobile_release_plan_nyc |

A third search of the database is performed for matching the tags, determined for the original message (at S312), to a reference message using a combination of the category, topic, and location attributes at S336. The results of that search are filtered for determining whether a reference message exactly matches the tags of the original message. Table 6 shows the attribute values for the category, topic, and location attributes, as well as the matching tag results for the illustrative example.

TABLE 6

| Category | Topic | Location | Match query - Tags |
| --- | --- | --- | --- |
| Question | Mobile Release | USA | plan, release, 4g, mobile, nyc |

As mentioned, the searches at S332-336 are performed based on predetermined sequence, and each result of the individual searches can be assigned a confidence score based on a priority of the searches at S338. Mainly, the message classification module 126 assigns scores for the available responses made in reference messages based on the percentage of match and level of match at S338.

In response to the search at S332 resulting in an exact match, the reply used to resolve and/or conclude a reference thread including the reference message can be used as a suggested response for the current message. Because this level of "exact" matching does not occur frequently, the module 126 treats the results as being the most accurate. At S340, the module 126 assigns a high accuracy score to the reference response made for the message determined at S332, thus placing a high confidence on using, as a suggested response, the reference response generating the outcome in the reference message.

The module 126 considers the level of matching using slugs as being quite accurate. In response to the search at S334 resulting in a matching reference message, the module 126 assigns a medium accuracy score to the reference response made for the message determined at S344, thus placing medium-level confidence on using, as a suggested response, the reference response generating the outcome in the reference message.

The module 126 considers the level of matching using tags as being less accurate. In response to the search at S336 resulting in a matching reference message, the module 126 assigns a low accuracy score to the reference response made for the message determined at S346, thus placing a low-level of confidence on using, as a suggested response, the reference response generating the outcome in the reference message.

Continuing with FIG. 3, the response generation module 128 collects the reference answers resulting from the search queries at S346. All of the possible responses are obtained from the query comparisons and matches. From these responses, the module 128 accesses each reference thread, which included the select reference message and response, and determines an outcome of the thread at S348. One aspect of the system 100 is that, by examining the outcome of the thread, it identifies which responses resulted in positive feedback from the user/customer. In this manner, the expert handling agent, replying to the select message, can formulate its response based on a knowledge of previous outcomes. The handling agent can focus suggested responses associated with positive feedback and avoid the suggested responses associated with negative feedback. This approach enhances a quality of customer care service by increasing the quality of responses available to the expert handling agent.

To review the outcome, the system analyzes the user-posted response, received after the reference handling agent's response was posted to the reference conversational thread. In one embodiment, this user-response can be the next posting in the reference thread. The module 128 determines whether the outcome was received one of positive and negatively by the user at S350. In response to the user expressing a positive sentiment (P at S350), the module 128 classifies the reference response as belonging to a suggested positive response at S352. In response to the user expressing a negative sentiment (N at S350), the module 128 classifies the reference response as belonging to a negative response at S354. In one embodiment, the reference responses classified as being negative are not included as suggested responses.

The suggested positive responses are displayed as references for the customer care handling expert/agent reference at S356. In the suggested positive responses can be ranked based on the accuracy scores assigned to the reference responses (at S338) at S358. The suggested list of responses can be provided to the user based on a hierarchy of confidence. In another embodiment, the system can display the matching responses based on pre-configured criteria, which articulates a weighted factor for each contextual attribute when scoring the relevance of each suggested response. For example, the sample message illustrated for Table 1 sought a release date for a product in New York. In one embodiment, the system can configure the "user location" attribute as having higher importance within the searching and ranking operations.

The suggested list of responses can be used for determining a course of action at S360. In this manner, the chances are increased for replicating a previously successful outcome, thus enhancing the quality of the customer service. By displaying the list of positive suggested responses without the negative suggested responses, the system 100 further increases its confidence that a selected response will resolve the issue, thus improving the quality of service.

The module 128 can further display a list of negative suggested responses for the handling expert to consider avoiding. Similarly, the system can rank these negative responses based on the confidence score provided at S338. FIG. 4 shows a sample screenshot generated as output by the method of FIG. 3, including a list of suggested positive responses, for considering, and a second list of suggested negative responses, for avoiding. The method ends at S362.

Although the method is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

For example, in one contemplated embodiment, the system 100 can store and search a database including a list of predefined conversations built from common questions and issues frequently raised by customers.

The present system and method improves the effectiveness of handling agents engaged in a social CRM environment. The system and method further lowers a cost of training handling experts.

One aspect of the present method and system is that it can help enterprise marketing services and CRM services to instantly and effectively interact with their customers in a social CRM environment. By referring to existing social conversations, the system can automatically provide suggestions for answers to customer queries.

By exploring and leveraging contextual information associated with a conversational thread communicated online, the system retrieve and rank context-specific, relevant responses from a conversation database. One aspect of the disclosed database, which is based on preconfigured textual information and/or a ranking scheme, is that the system can automatically output suggested responses and/or options to customer queries. These suggestions can be provided to handling experts and/or agents in the social CRM.

By generating both positive and negative suggestions, the system can help the handling expert avoid posting an undesired, negative response.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method for responding to a current message posted in a social media stream, the method comprising:
  at a server computer, implementing instructions for:
    monitoring a social media site for at least one current message including select subject matter;
    in response to identifying a current message, collecting a series of exchanges that form a conversational thread including the current message;
    determining at least one content attribute of the conversational thread including the current message, including:
      extracting a set of tags forming the current message by:
        splitting at least the current message into separate words;
        filtering and removing irrelevant words so that only contextual information remains;
        associating each of the remaining words as a tag,
      forming at least one combination of tags to generate at least one slug, and
      associating each slug as a content attribute;
    classifying the current message using at least one key attribute;
    searching a database for a reference message using a combination of the at least one content and key attributes;
    determining a previous outcome of a reference thread including the reference message, the determining including:
      parsing words in a customer-posted response of the reference thread, where the customer-posted response was made after a user's previous solution was posted to the reference thread, and automatically applying the parsed words to a stored dictionary to associate the words as belonging to one of a number of predetermined sentiments; and, in response to the words belonging to a positive sentiment, displaying the user's previous solution for determining a course of action.

2. The method of claim 1, wherein the at least one content attribute is selected from a group consisting of:
a set of tags extracted from the current message;
at least one slug generated from at least one combination of tags; and,
quoted text of the current message.

3. The method of claim 1, wherein the key attribute is selected from a group consisting of:
a category;
a topic that the current message relates to;
a location; and,
a combination of the above.

4. The method of claim 1 further comprising:
rating a confidence of the reference message based on the combination of the at least one content and key attributes used in the searching.

5. The method of claim 1, further comprising:
categorizing the current message into one of a predetermined set of categories classifying a purpose of the message; and,
searching the database using at least the category one key attribute in the combination.

6. The method of claim 1 further comprising:
comparing tags in the current message with a stored dictionary for identifying at least one topic of the current message;
classifying the current message as belonging to the topic; and,
searching the database for the reference message using at least the topic as one key attribute in the combination.

7. The method of claim 1 further comprising:
determining a location of a device posting the current message; and
searching the database for the reference message using at least the location as one key attribute in the combination.

8. The method of claim 1, wherein the determining the course of action includes:
accessing a database of reference threads to determine if the current message corresponds to one of a set of reference threads;
for the current message being determined as corresponding to a reference thread, identifying a sentiment of a last message in the reference thread as belonging to one of a negative and a positive sentiment;
for the message being determined as not corresponding to a reference thread, providing the message to a user for review.

9. The method of claim 5, wherein the determining the course of action includes:
for the reference message belonging to the positive sentiment, providing the previous outcome to the user as a suggested response to the thread; and,
for the reference message belonging to the negative sentiment, providing the message to the user for review.

10. The method of claim 5, wherein the reference threads include previous threads that were concluded.

11. A computer program product comprising non-transitory tangible media which encodes instructions for performing the method of claim 1.

12. A system for responding to a message posted in a social media stream, the system comprising:
an auto-suggesting response device comprising:
a memory;
a downloadable software module that operates on a server computer linked to a customer computing device by a network;
a processor coupled to the memory programmed with executable instructions for:
monitoring a social media site for at least one current message including select subject matter, and,
in response to identifying a current message, collecting a series of exchanges that form a conversational thread including the message,
extracting a set of tags forming the current message, the extracting including:
splitting at least the current message into separate stem words,
filtering and removing irrelevant words from the separated words so that only contextual information remains, and
associating each of the remaining words as a tag,
forming at least one combination of tags to generate at least one slug, and associating each slug as a content attribute;
categorizing the current message into one of a predetermined set of categories,
searching a database for a reference message using a combination of the at least one content and key attributes, where in the content attribute is extracted from the conversational thread,
determining an outcome of a reference thread including the reference message by parsing words in a previous customer-posted response of the reference thread, where the customer-posted response was made received after a user's previous solution was posted to the reference thread and automatically applying the parsed words to a stored dictionary to associate the previous customer-posted response as belonging to one of a number of predetermined sentiments, and
in response to the previous customer-posted response belonging to a positive sentiment, displaying the user-s previous solution for providing in the thread.

13. The system of claim 12, wherein the predetermined set of categories includes at least one of:
reasons why messages can be posted in the thread;
types of sentiments that the message conveys based on tags in the message;
topics of messages;
locations of messages; and,
a combination of the above.

14. The system of claim 12, wherein the processor executes further instructions for:
comparing tags in the current message with a stored dictionary for identifying at least one topic of the message;
assigning the topic to the current message; and,
searching the database for the reference message using the topic.

15. The system of claim 12, wherein the processor executes further instructions for:
determining a location of a device posting the current message, and
searching the database for the reference message using the location.

16. The system of claim 12, wherein the processor executes further instructions for:

categorizing the current message into one of the predetermined set of categories based on the slugs; and, searching the database for the reference message by comparing the slugs with reference messages.

17. The system of claim 12, wherein the processor executes further instructions for:

in response to the response search module accessing a database of reference threads to determine if the current message corresponds to one of a set of reference threads, for the current message being determined as corresponding to a reference thread, identifying a sentiment of a last message in the reference thread as belonging to one of a negative and a positive sentiment.

18. The system of claim 15, wherein the processor executes further instructions for:

for the reference message belonging to the positive sentiment, providing an answer posted to the reference thread as a reply to the current message; and, for the reference message belonging to the negative sentiment, providing the message to the user for review.

19. The system of claim 16, wherein the reference threads include previous threads that were concluded.

20. The method of claim 1, wherein the extracting of the tags includes:

splitting the conversational thread into separate words;

parsing the split words to generate stem words.

* * * * *